United States Patent [19]

Young

[11] 4,047,427

[45] Sept. 13, 1977

[54] LOAD-SENSING AND ADJUSTING METHOD FOR OPERABLE MACHINES

[75] Inventor: Sheldon E. Young, Western Springs, Ill.

[73] Assignee: Vibro/Dynamics Corporation, LaGrange, Ill.

[21] Appl. No.: 652,203

[22] Filed: Jan. 26, 1976

[51] Int. Cl.² .............................................. G01L 5/00
[52] U.S. Cl. .................................. 73/141 A; 177/211
[58] Field of Search ...................... 73/141 A; 177/211

[56] References Cited

U.S. PATENT DOCUMENTS

| | | | |
|---|---|---|---|
| 2,980,414 | 4/1961 | Perry et al. | 177/211 |
| 3,072,209 | 1/1963 | Perry | 177/211 |
| 3,090,226 | 5/1963 | Corti et al. | 73/141 A |
| 3,113,631 | 12/1963 | Moulin et al. | 177/211 |
| 3,277,718 | 10/1966 | Ruge | 73/141 A |
| 3,332,647 | 7/1967 | Young | 248/24 |

*Primary Examiner*—James J. Gill
*Assistant Examiner*—Anthony V. Ciarlante
*Attorney, Agent, or Firm*—E. Manning Giles

[57] ABSTRACT

A vibration isolator of the type used for mounting industrial equipment, having the capability of measuring forces exerted upon the isolator to adjust the support provided by each of the isolators upon which the equipment is mounted so as to provide the most suitable distribution of support and to reduce the transmission of dynamic forces created by the operation of the equipment. The isolator comprises a resilient base, a bearing plate on the base and a sensing device cooperating therewith, with or without means for attaching the isolator to the equipment. A force applied to the isolator exerts pressure on the bearing plate which is transmitted therethrough to the resilient base causing each of them to experience some deformation. The sensing device detects the pressure or deformation caused by the force applied to the isolator and generates a signal corresponding to said force. The signal is transmitted to indicating instruments suitably calibrated to show the static and dynamic forces to which both the equipment and foundation are subjected, as well as the weight and center of gravity of the equipment.

2 Claims, 6 Drawing Figures

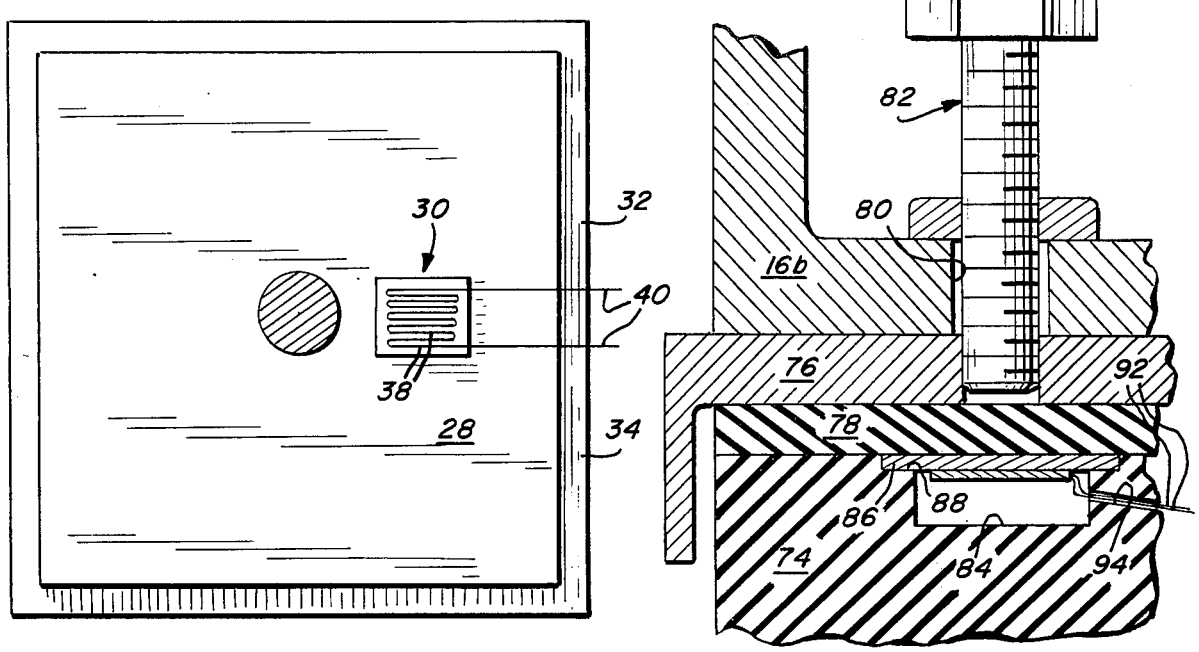
FIG. 3
FIG. 5
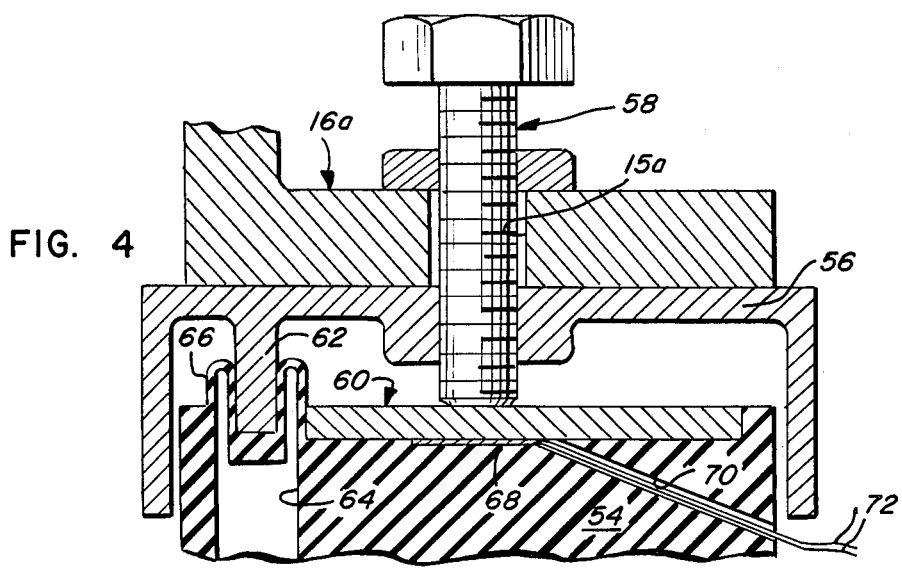
FIG. 4
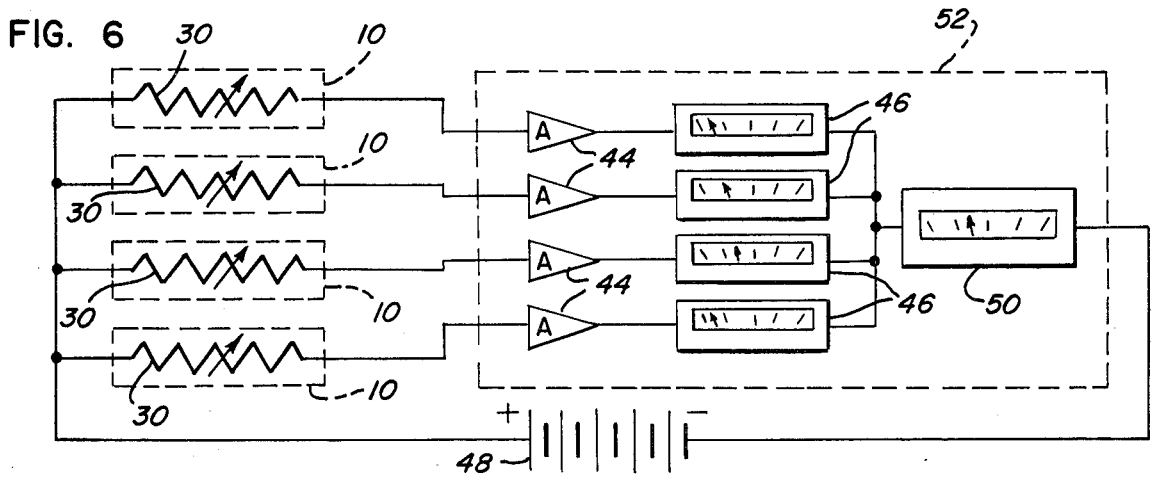
FIG. 6

LOAD-SENSING AND ADJUSTING METHOD FOR OPERABLE MACHINES

BACKGROUND OF THE INVENTION

Industrial equipment is subjected to varying levels of vibration and impact, usually created by operation of the equipment itself, but sometimes transmitted to the equipment from the floor on which it is mounted. Such vibration impairs accuracy of operation, reduces useful life of the equipment, creates noise pollution and causes operator fatigue. Moreover, other plant personnel may experience long term physical and psychological effects resulting from daily exposure to the noise and vibration caused by operation of such equipment.

Such problems can be substantially reduced or eliminated by using anti-vibration mounts to support equipment which either produces or must be protected against vibration. The simplest of such mounts may be pads of cushiony material, placed under the equipment or the supporting structure. In recent years, more advanced mounts have been developed. The more sophisticated isolators, such as those shown and described in my U.S. Pat. No. 3,332,647, granted July 25, 1967, have the additional advantage of permitting precise height adjustment and accurate leveling of the equipments.

For optimum efficiency, all of the isolators supporting a machine should be adjusted with precision to equalize the load supported one each leg of the supporting structure, or to distribute the load in a manner to provide optimum operating characteristics. Heretofore, there has not been any practical way of determining the precise load supported by each isolator on which a machine is mounted so as to provide the information necessary to permit adjustment for optimum load distribution.

In many cases, the weight of the equipment and the location of its center of gravity are not accurately known. The addition of dies, controls and other auxiliary equipment, modifications to the equipment, adjustments in position, and the changing positions of moving parts result in changes in weight and center of gravity, and often introduce changes in inertia forces. These uncertainties and variations make it necessary to guess the static and dynamic load supported on each isolator. Even when the weight and center of gravity location are known, there has been no practical method of determining when the isolators are adjusted to provide optimum distribution of the load supported on the separate isolators, nor to know the magnitude of dynamic forces transmitted to the foundation.

A major purpose of this invention is to provide an adjustable vibration isolating means which has the capability of indicating the force exerted thereon. Another object is to provide such means which shows variations in load during operation of the equipment it serves to support. A further purpose is to enable not only selective or simultaneous read-out as to the load on each isolator, but also cumulative total weight on all the isolators, location of the center of gravity, the transmitted impact forces and the inertia forces generated by the operation of the machine. A further purpose is to provide a means whereby the load supported by the various isolators may be adjusted to provide the most desirable distribution. A further purpose is to provide positive information upon which to base the design of foundations, floors, etc. and to take necessary steps to strengthen such structures if the actual forces as measured by the isolators prove to be greater than originally provided for in the design of the supporting foundation. A still further object is to develop such means which are readily adaptable to existing equipment installations and which are low cost, dependable and versatile. A particularly important purpose is to permit study of force changes which may occur during machine operation, such as cyclical imbalances which affect the stability of the machine, thus indicating the necessity of taking safety precautions or of eliminating unsafe operating conditions.

SUMMARY OF THE INVENTION

This invention relates to vibration isolators of the type used to support industrial machinery and refers more particularly to isolators of this character in which sensing devices are incorporated for measuring the forces exerted on the isolators.

My preferred means for measuring such forces utilizes a strain gauge, such as a grid formed by a length of fine wire arranged in a series of generally parallel rows. The gauge is secured to a surface which is cause to deform slightly when a force is applied to the isolator. Such deformation causes the strain gauge wire to stretch or compress, thus altering the overall length of the wire, thereby modifying its electrical resistance. A voltage is applied to the strain gauge and this produces a signal which is determined by the electrical resistance of the strain gauge wire. As the electrical resistance of the strain gauge is modified by the changing forces on the isolator, the signal changes accordingly.

The signal is amplified and transmitted to a suitable meter calibrated in force units such as pounds or kilograms. In a vibration isolator of the type disclosed in my U.S. Pat. No. 3,322,647, the force exerted on the cover of the isolator by the equipment it supports causes a force of essentially equal magnitude to be exerted on the bearing plate, and thereby upon the resilient member. The force exerted by the leveling screw on one surface of the bearing plate causes a slight "dishing" thereof. Thus the face of the plate engaged by the leveling screw becomes slightly concave, thus compressing the metal at that surface while causing the obverse face to become somewhat convex, thus stretching the material at that surface. The compressive force exerted on the resilient base causes it to reduce in height and to bulge laterally, due to pressure build-up in the resilient base.

A strain gauge may be applied to the surface of the bearing plate which compresses or to the surface which stretches due to the force. The compressing or stretching of the surface to which the strain gauge is secured causes the strain gauge wire to be lengthened or shortened accordingly, thereby increasing or reducing the electrical resistance of the strain gauge. When a voltage is applied to the strain gauge the current is determined by the electrical resistance and the current is caused to vary in accordance with changes in the resistance. The electrical current or signal is amplified and is measured by a meter, oscilloscope or other suitable read-out device.

Similarly equipped isolators may be installed under each leg of industrial equipment, in which case the total weight of the equipment would by indicated by the sum of all the meter readings. Likewise, the location of center gravity would be determined by the relative values of the various meter readings. It is contemplated that the output signals could be combined electrically to provide direct readings of equipment weight and center of gravity. The information thus obtained provides a positive means for checking the weight, center of gravity location and dynamic forces exerted on the isolators and further provides the basis for determining the forces, transmitted to the plant floor as well as those reflected back into the equipment.

BRIEF DESCRIPTION OF THE DRAWINGS

The preferred and alternative embodiments of my invention are shown in the accompanying drawing in which

FIG. 3 is a view on the line 3 — 3 of FIG. 2;

FIG. 4 is a view corresponding to FIG. 2, but showing an alternative embodiment of the invention;

FIG. 5 is a similar view showing another alternative embodiment of the invention; and FIG. 6 is a schematic diagram of the electrical circuitry in one embodiment of the invention.

DESCRIPTION OF PREFERRED EMBODIMENT

Figure 1:
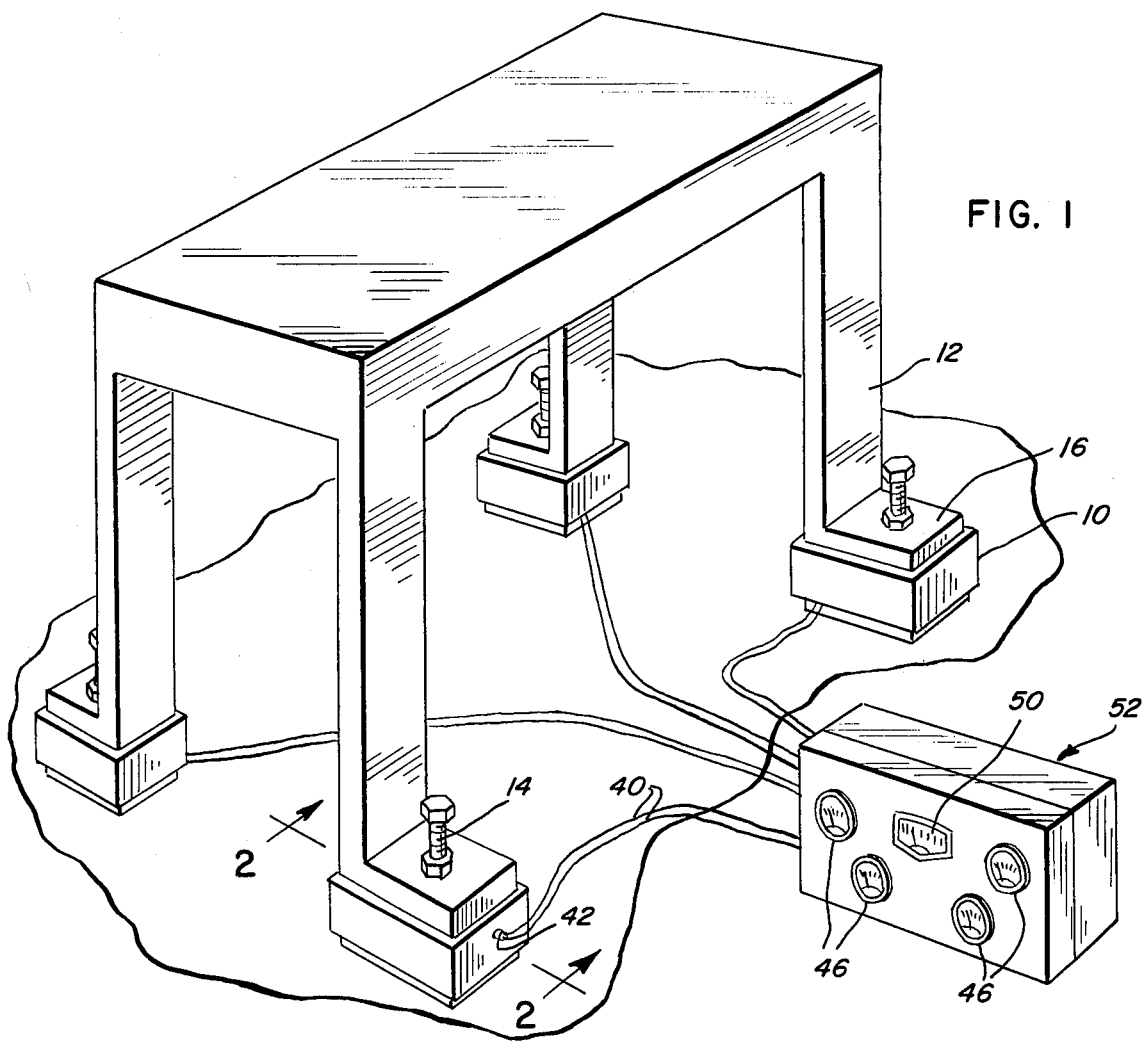
FIG. 1 is a perspective view of a machinery support having four legs, each of which is mounted on an adjustable vibration isolator embodying my invention.

Referring to FIG. 1, the isolators embodying my invention are designated generally by the reference numeral 10. Each of the respective legs 12 which serve to support a unit of industrial equipment (not shown) is mounted on an isolator 10 by means of the leveling screw or adjusting bolt 14 passing through a suitable hole 15 in the flange-like foot portion 16 of each of the respective legs 12. The bolt 14 is engaged as shown in a threaded hole 18 in the cover member 20 of the isolator 10. A lock nut 22 holds the foot portion 16 in firm engagement with the cover 20.

The base member 24 of the isolator 10 is a combination of parts including a relatively thick body 26 of resilient, compressible material such as neoprene and a bearing plate 28.

In the preferred form, the resilient base member 26 of the isolator 10 supports the bearing plate 28. The cover 20 is supported on the bearing plate 28 by means of the leveling screw 14. A strain gauge 30 is secured to the top surface of the bearing plate 28. Thus when a load force is exerted through the adjusting bolt 14 on the bearing plate 28, a compressive strain is exerted upon the top surface thereof and upon the strain gauge 30 secured to that surface.

The base 24 may be provided with a shallow recess 32 on its top side, surrounded by peripheral shoulders 34, providing a seat to receive the bearing plate 28, thus providing positive means for preventing lateral displacement of the plate. Like-wise, the base 24 may be provided with a central opening 36 axially aligned with the adjusting bolt 14 so as to increase the range of deformation of the bearing plate 28 under varying loads.

As shown in FIG. 3, the strain gauge 30 consists of a continuous length of fine resistance wire 38 arranged in a large number of back and forth linear rows in closely spaced parallel relation and bonded with suitable adhesive to the surface of the bearing plate 28 so that any "dishing" or downward deformation imparted to the plate will cause slight compression of the rows of wire 38 and a consequent shortening of their total length. As the length of the resistance wire is reduced, the resistance characteristics thereof are altered so that even the slightest "dishing" of the bearing plate 28 causes an electrically perceptible change in the resistance of the strain gauge 30.

The wires 40 leading from the strain gauge 30 pass through an electrical fitting 42 as shown and are connected electrically to an amplifier 44 which, in turn, is connected to a meter or indicator 46 which gives a read-out corresponding to the amplified electrical signal it receives from the strain gauge 30.

Where a plurality of isolators 10 are used, such as under the respective legs 12 of a unit of equipment as shown in FIG. 1, a total read-out from all of isolators can be obtained, as well as individual readings from each isolator. FIG. 6 shows diagrammatically an electrical circuit for obtaining such separate and combined read-outs. As the diagram shows, each isolator 10 has a variable resistance strain gauge 30 connected to a source of electrical current which, in the illustrated embodiment, is a battery 48. Each strain gauge 30 is connected electrically to an amplifier 44 which amplifies the electrical current passing from battery 48 through the strain gauge 30. The respective amplifiers 44 are connected electrically to corresponding meters 46 which provide variable indications depending upon the amperage of the signals received from the respective amplifiers 44. The meters 46, however, may be calibrated in pounds or kilograms so that the read-out is in terms of weight rather than current. It will be understood that through prior testing, it can be determined with respect to each strain gauge the precise change in resistance which is obtained with various pre-determined loads and the meter 46 to be used therewith may then be calibrated accordingly.

The electrical currents supplied to the respective meters 46 are consolidated as shown and connected to a master meter 50 which gives a cumulative total read-out, i.e., the sum of the weights indicated on the individual meters 60. Normally, the amplifiers 44, the individual meters 46 and the master meter 50 would be contained in a single housing 52 as shown in FIG. 1 and as indicated by the broken lines in FIG. 6, located in some convenient location such as adjoining the equipment that is mounted on the isolators 10.

The source of electric current may, if desired, be the line current available in the plant where the isolator-mounted equipment is installed. In that event, the electrical circuitry would be modified accordingly. Moreover, it is to be expected that the types of meters used to indicate loads will be contingent upon circumstances of type of installation, customer preference and the like. A single meter could, of course, be used and wired for selective read-out of the load on any individual isolator or various combinations thereof.

An alternative form of isolator and strain gauge assembly is shown in FIG. 4, wherein the isolator corresponds to the preferred embodiment shown in my U.S. Pat. No. 3,332,647. The form of isolator disclosed therein comprises the combination of a resilient base 54, a cover 56, an adjusting bolt 58 and a bearing plate 60. The adjusting bolt 58 is threadably engaged in the cover 56 and projects through the hole 15a in the foot 16a upon the bearing plate 60. The bearing plate 60 is nested in a recess of corresponding size and shape molded into the top surface of the base 54. The cover 56 is provided on its under side with a plurality of spaced, downwardly depending fingers 62. Correspondingly spaced holes 64 are provided in the base 54 and are of substantially greater lateral dimension than the fingers 62. Surrounding each hole 64 is a flexible, thin-walled gripper 66, integral with the base 54 and molded of the same resilient material, such as neoprene. At its juncture with the base, the gripper 66 has substantially the same inside diameter as the hole 64. About midway of its length, the gripper 66 is turned back within itself and the end portion has a reduced diameter of not more than that of the depending finger 62 so that the end of each gripper 66 will fit tightly upon the end of the corresponding finger 62.

In order to adapt the present invention to the isolator of my said patent, as described, a strain gauge 68 may be secured to the under side of the bearing plate 60 either in axial alignment with the adjusting bolt 58, as shown, or off center with respect thereto. A lateral hole 70 may be provided in the base to permit the wires 72 to pass from the strain gauge 68 to the exterior of the isolator. From there, the wires lead to an amplifier and read-out meter as heretofore described.

The modified form of isolator shown in FIG. 5 has no adjustment capability and is particularly adpated for use as a mount for one leg of a unit of equipment, the other legs of which are mounted on an adjustable isolator.

The isolator of FIG. 5 has a resilient base 74, a cover 76 and an elastomeric cushion 78 interposed therebetween. The cover 76 has a threaded hole 80 in which a bolt 82 is adapted to be engaged and a lock nut 84 to permit attaching the foot 16b securely to the cover 76.

A shouldered recess 84 is provided in the upper side of the base 74 and is adapted to support the edges of a disc 86 on the peripheral shoulders 88 of said recess 84. A strain gauge 90 is adhered to the under side of said disc 86 and electrical wires 92 pass therefrom through a hole 94 to the exterior of the base 74. The wires, in turn, are connected to an amplifier and a meter (not shown), which function as in the previously described embodiments.

The load-sensing isolator in FIG. 5 is not adjustable. This embodiment shows how the load-sensing adjustable isolator of my invention can be modified where it is used with equipment which has its own built-in leveling means or where it is not essential that each of a plurality of isolators have the capability of height adjustment. For example, where a unit of industrial equipment is supported on four legs, as in FIG. 1, it would suffice to mount the two most accessible adjoining legs 12 on adjustable isolators 10. The other two legs could be mounted on non-adjustable isolators such as shown in FIG. 5. The electrical circuitry would be the same as where all four isolators are adjustable.

Figure 2:
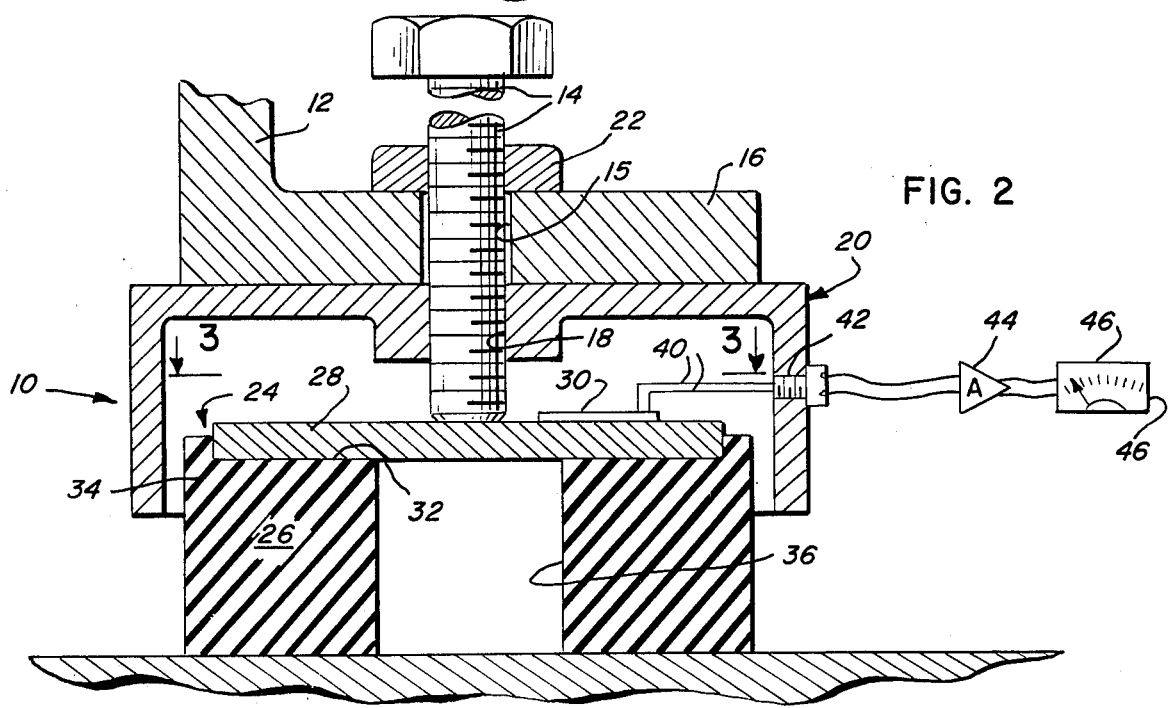
FIG. 2 is a sectional view on the line 2 — 2 of FIG. 1.

It is contemplated that in some applications it may be desirable to use a non-adjustable isolator of the type shown in FIG. 5 at one supporting location, in combination with adjustable isolators such as in FIG. 2 or 4 at the other supporting locations. Thus, for example, a machine supported on four legs could be leveled and weight distribution could be adjusted as desired if three legs were mounted on adjustable isolators and the least accessible leg was mounted on a non-adjustable isolator.

In some types of industrial equipment, a significant change occurs in the balance or center of gravity during operation. Where such equipment is mounted on adjustable isolators embodying my invention, the load dynamics on each isolator can be studied during operation. This permits precision adjustment of each isolator, based on such study of the load dynamics so as to balance the equipment for maximum operational stability and safety.

With respect to the master meter, which shows the cumulative total of the load readings on the respective individual meters, read-outs can be used for various purposes. Where floor loading is critical, it is useful to be able to ascertain not only the static weight of the equipment but also the maximum load force exerted upon the plant floor during operation. Where the weight of successive work-pieces needs to be checked for any reason, the master meter provides that information by subtracting the normal weight reading from the read-out after the workpiece is in place.

It will be understood that the embodiments of my invention as shown and described herein are exemplary of preferred forms thereof, it will be apparent to persons in the art that diverse modifications and embodiments are within the contemplation of my inventive concept, the scope of which is to be determined by the appended claims.

I claim:

1. The method of optimizing the weight distribution, balance and performance of an operable machine which comprises mounting same on a plurality of height-adjustable, load-indicating, vibration-isolating supports and thereafter selectively adjusting the height of each such support while observing indications of load thereon so as to equalize weight distribution, then placing such machine in operation, observing variations in load indications during such operation and selectively adjusting the height of any such supports as necessary to distribute weight for optimum stability consonant with the cyclical dynamics during operation of such machine.

2. The method of optimizing the weight distribution, balance and performance of an operable machine which comprises mounting same on a plurality of height-adjustable, load-indicating vibration-isolating supports and thereafter selectively adjusting the height of each such support while observing indications of load thereon so as to apportion weight for preliminary leveling, then placing such machine in operation, observing variations in load indications during such operation and selectively adjusting the height of any such supports as necessary to distribute weight for optimum stability consonant with the cyclical dynamics during operation of such machine.

* * * * *